Feb. 17, 1925.

H. FERGUSON

PLOW

Original Filed March 8, 1919

1,526,972

Inventor:
Harry Ferguson
By Diederhein+Fairbanks
Attorneys.

Patented Feb. 17, 1925.

1,526,972

UNITED STATES PATENT OFFICE.

HARRY FERGUSON, OF BELFAST, IRELAND.

PLOW.

Original application filed March 8, 1919, Serial No. 281,520. Divided and this application filed November 19, 1921. Serial No. 516,403.

*To all whom it may concern:*

Be it known that I, HARRY FERGUSON, of Belfast, Ireland, a subject of the King of Great Britain and Ireland, have invented certain new and useful Improvements Relating to Plows, of which the following is a specification.

This invention relates to single, or multi-furrow, tractor plows. This application is a division of my prior application serial No. 281,520, filed March 8th, 1919, and said application No. 281,520, is a division of my application Serial #251,202, filed Aug. 24th, 1918.

When a plow is closely hitched, or connected, to its tractor, there is a tendency for the rear end to rise out of the ground during ploughing. This difficulty is particularly met with in light tractor plows, and the object of this invention is to provide improvements whereby the difficulty is overcome, and a light tractor plow is rendered more efficient in use than hitherto.

It is essential for good ploughing work that lateral movement be provided for between the plow and the tractor so that the tractor can be turned to the right or the left; and a vertical movement be provided for between the parts to enable the tractor to pass over an obstacle without affecting the plow, and to enable the tractor to pass from a hill on to level ground, or vice versa.

Under this invention a draught connection is provided between the plow and the tractor which pivotally, or equivalently, connects the two parts, and is arranged in the line of draught, and means associated with the connection serve for regulating the range of movement of the plow relatively to the tractor, and vice versa.

The draught connection between the plow and the tractor allows the plow freedom of movement both laterally and vertically, and is characterized by means whereby a force, or pressure, for holding the plow shares down to their work, is obtained by utilizing the draught required for the plow itself.

Abutting members are provided between the plow frame and the tractor, which members, under the draught required for the plows, are caused to exert a pressure on the plow frame for the purpose stated. Means are, or may be, provided for angularly adjusting the plow frame and for limiting the lateral movement thereof.

One construction of the improved connection between a tractor and a plow is given, by way of example, on the accompanying drawings, whereon:—

Figure 1:
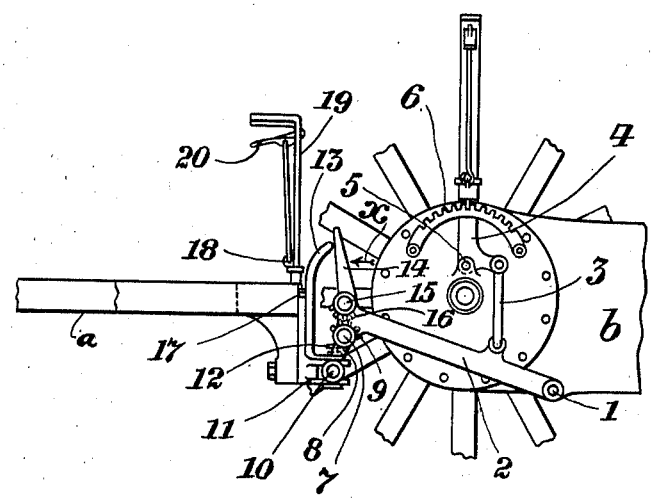
Figure 2:
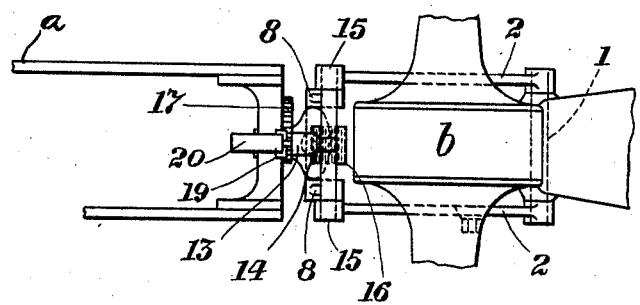

Fig. 1 is an elevation and Fig. 2 a plan of the construction illustrated.

Referring to the drawings:—

$a$ is the plow frame and $b$ the tractor. The latter is provided with a crankshaft 1 having webs 2, one of which is connected by a link 3 with a lever 4 pivoted to the tractor frame at 5 and having means to cooperate with a quadrant 6 for the purpose of retaining the webs 2 of the crank in different positions of angular adjustment and thereby adjusting the position of the plow relatively to the tractor.

A crank pin 7 connects the two crank webs 2, 2 together at the end remote from the crank shaft 1, and a pair of links 8, 8 on the pin 7 and rigid with a toothed sector, or pinion, 9, carry a cross shaft 10 to which a forked head 11, on the plow frame, is connected by means of a safety pin 12. The forked head is pivoted to the plow frame $a$ so as to turn freely about a horizontal axis, and has an abutment 13 which is engaged by a lever arm 14 arranged to turn on a secondary pin 15 mounted in the crank webs above the crank pin 7. The lever arm 14 is formed with a toothed sector, or pinion, 16 which meshes with the sector 9.

At its upper end the forked head 11 is provided with a toothed quadrant 17, and a pawl projecting from a sleeve 18, which is slidably fitted on an upright 19, is capable of engaging the quadrant. The upright is rigidly connected to the plow head, and by manipulating a hand lever 20 mounted in the upright 19, the pawl is so engaged with the toothed quadrant as to hold the plow frame at any desired angle.

The operation is as follows:—

The operator releases the usual locking, or holding, lever 4 and lowers the crank webs 2 for entering the plow into the ground. The draught of the plow is taken on the links 8 which tend to move to a horizontal position, and in doing so turn the toothed sector 9 which meshes with the toothed sector 16 and imparts movement to the lever arm 14 in the direction of the arrow $x$, Fig. 1, whereby the lever arm is caused to engage the abutment 13 and to exert a pressure thereon. Such pressure depends on the gear ratio and the draught required, and serves to hold the plow shares down in the proper working position in the ground. It will be seen that with this arrangement the tendency is to raise the front of the plow and exert a pressure on the rear of the plow. Freedom of lateral and vertical movements is obtained through the crank pin 7, safety pin 12, and forked head 11. Any tendency for the rear of the plow to rise is countered by the lever arm 14 bearing against the abutment 13, the pull of the tractor acting by way of the line of draught passing through the crank pin 7 and tending to move the latter relatively to the cross shaft 10 and operate the lever arm 14 against the abutment 13 through the toothed sectors 9 and 16. In this manner the tendency to maintain the plow shares in position operates through the line of draught. By the improved arrangement the plow is free to move a predetermined distance, regulated by a safety pin 12, relatively to the tractor in one direction and the plow shares are retained in the operative position by the weight of the plow and tractor when the lever arm bears against the abutment 13.

Having now fully described my invention what I claim and desire to secure by Letters Patent is:—

1. In combination, a tractor, a plow, a coupling between the tractor and plow, and automatic compensating means co-acting between the tractor and plow to hold the plow in the ground with a force proportional to the draught exerted by the tractor on the plow.

2. In combination, a tractor, a plow, a jointed coupling between the tractor and plow, and an automatic compensating lever arm connected to the coupling and moved thereby to hold the plow in the ground, while being drawn by the tractor, with a force proportional to the draught exerted by the tractor on the plow.

3. In combination, a tractor, a plow, a coupling between the tractor and plow, said coupling comprising means pivotally connected to said plow and to said tractor and carrying a toothed gear, a lever arm geared to said toothed gear, and an abutment on said plow and engaging with the lever arm to hold the plow in the ground with a force proportional to the draught exerted by the tractor on the plow.

4. In combination, a tractor, a plow, a coupling between the tractor and plow, said coupling comprising an adjustable web pivoted near one end to the tractor, a link pivotally connected to the floating end of said web and to the plow, and a toothed gear rigid with said link, a lever arm pivoted near one end to the web adjacent to the link and geared to the toothed gear, and an abutment on the plow and engaging with the lever arm whereby the plow is held in the ground with a force proportional to the draught exerted by the tractor on the plow.

5. In combination, a tractor, a plow, a coupling between the tractor and plow, said coupling permitting the plow vertical and lateral movement, and automatic compensating means co-acting between the tractor and plow to hold the plow in the ground while being drawn by the tractor, said means being actuated with a force proportional to the draught exerted by the tractor upon the coupling.

6. In combination, a tractor, a plow, a jointed coupling between the tractor and plow adapted to permit the plow vertical and lateral movement, and a lever arm connected to the coupling and moved thereby to hold the plow in the ground with a force proportional to the draught exerted by the tractor on the plow.

7. In combination, a tractor, a plow, a coupling between the tractor and plow adapted to permit the plow vertical and lateral movement, an abutment on the plow, a lever arm connected with the tractor pressing upon the abutment to hold the plow in the ground, the pressure of said lever being proportional to the draught exerted by the tractor on the plow.

8. In combination, a tractor, a plow, an abutment connected to the plow, a jointed coupling between the tractor and plow adapted to permit the plow vertical movement, means to adjust the height of the coupling relatively to the tractor, said coupling comprising a link pivotally connected to the tractor and to the plow, a toothed gear rigid with said link, a pivoted lever arm geared to said toothed gear and adapted to engage said abutment to hold the plow in the ground with a force proportional to the draught exerted by the tractor on the plow.

9. In combination, a tractor, a plow, a coupling between the tractor and plow, said coupling comprising two webs pivoted for oscillation to the tractor, two links pivoted to the webs, a toothed gear rigid with a link, a horizontal cross shaft pivoted in the links, a forked head, a vertical safety pin pivotally connecting said cross shaft to said forked head, a longitudinal horizontal pivot pin connecting said forked head to the plow, an abutment carried by the forked head, a toothed lever arm pivoted to a web, meshing with the said toothed gear, and engaging said abutment to hold the plow in the ground with a force proportional to the draught exerted by the tractor on the plow, and means to hold the coupling from oscillation about its longitudinal horizontal pivot pin.

In testimony whereof I affix my signature in presence of two witnesses.

HARRY FERGUSON.

Witnesses:
 ANDREW HAMILTON,
 JOHN HERBERT HUNTER.